W. H. CHAMBERLIN
Hold-Back Attachment.
No. 104,557. Patented June 21, 1870.
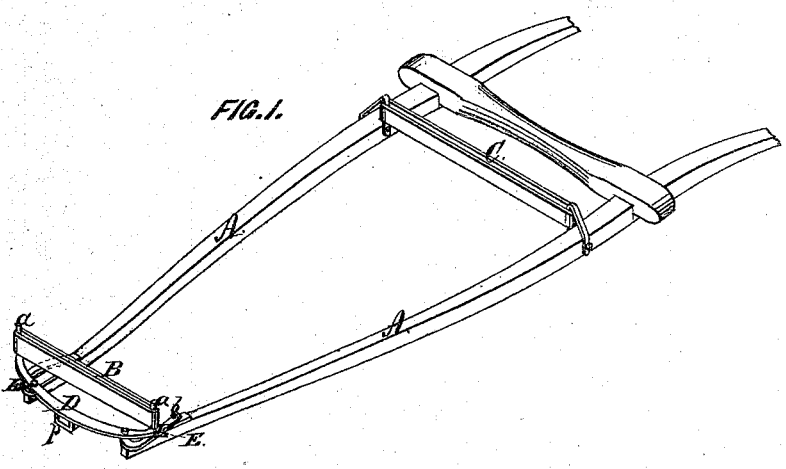
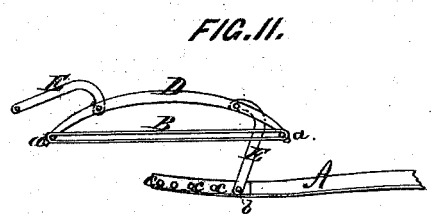
Witnesses.
Inventor.

United States Patent Office.

WILLIAM H. CHAMBERLIN, OF MEDINA, NEW YORK.

Letters Patent No. 104,557, dated June 21, 1870.

IMPROVEMENT IN DRAFT AND HOLD-BACK ATTACHMENT.

The Schedule referred to in these Letters Patent and making part of the same.

*To all whom it may concern:*

Be it known that I, WILLIAM H. CHAMBERLIN, of Medina, in the county of Orleans and State of New York, have invented a new and improved Draft and Hold-back Attachment for Horses, of which the following is a specifiation.

Nature of the Invention.

This invention consists in an improved method of applying the draft and hold-back to the thills or pole, by the use of straps, as hereinafter described.

General Description.

In the drawing—

Figure 1 is a perspective view, and

Figure 2 a plan, the latter showing the draft attachment turned to one side.

A A are thills of ordinary form.

B is the draft-strap; and

C, the hold-back strap, arranged at such a distance apart as to allow the horse to travel between them, and, when at rest, to stand entirely free of both, by which means no binding or chafing is produced, a matter of much importance, especially in warm weather.

These straps are preferably made of leather, but may be made of any other suitable material. They are also preferably made of double lengths, as shown, but, if desired, may be made of single lengths.

The draft-strap is attached to bearings, *a a*, of a yoke, D, and, if desired, may be made stationary, with the ends of the thills; but I prefer to swivel the yoke to swing-arms E E, which, in turn, are jointed to the thills by means of a bolt, *b*, in each.

I make series of holes, *c c c*, in the ends of the thills, for these bolts to enter, thereby enabling the straps to be adjusted to any desired distance apart, longitudinally, to accommodate to horses of different sizes. This arrangement also allows the draft attachment to swing off to one side, as shown in fig. 2, for placing the horse into the thills.

The advantages of the above-described arrangement are as follows:

First, both the draft and hold-back arrangement are combined directly with the thills, thereby obviating the use, not only of the ordinary collar and harness, and traces, but also the breeching and hold-back straps. This greatly reduces the amount of harness upon the animal, thereby saving expense and trouble, and, what is more important, saving a burden and discomfort to the animal in warm weather.

Second, the making of the draft and hold-back attachments in the form of straps, and not of solid blocks or bearings, gives great ease of contact, and insures the adaptation of the bearing-surfaces to the horse's shoulders without chafing or wearing, which could not otherwise be easily attained. If double lengths of strap are used, as shown in the drawing, the position of the bearing-surface may be changed at pleasure, thus equalizing wear. As before stated, the draft-strap may be made stationary on its bearings or holds, and still, by its flexibility, fit perfectly the horse's shoulder, yet the swaying action of the yoke may be found convenient and preferable under some circumstances.

Third, the arrangement of the swiveled yoke D, swing-arms E, and adjusting-holes *c c*, combined with the draft-strap, allow a free action, a longitudinal adjustment, and enable the device to swing off to allow the horse to be entered.

If desired, a strap may be attached to loop *p* on the yoke, and connected with the belly-band, to serve as a hold-back in some cases.

The straps may also be easily connected with a pole, instead of thills, by providing a suitable yoke and connecting parts.

The draught arrangement is also specially applicable to ordinary farm use, or other use where draught alone is involved.

I am aware of a patent issued to Cyrus C. Cole, January 4, 1870, in which a pivoted breast-block is attached in front of the thills, but as this block is rigid, and is centrally attached, it is not the equivalent of my invention.

Claims.

What I claim, and desire to secure by Letters Patent, is—

1. The draft and hold-back attachment extending across the thills, as herein described, constructed either or both of flexible straps of leather, or equivalent material, substantially as set forth.

2. The combination, with the thills A A, of the straps B C, arranged as described, and operating in the manner and for the purposes specified.

3. The strap B, yoke D, and swing-arms E E, arranged to form the draft attachment, and operating in connection with the adjusting-holes *c c c*, in the manner and for the purpose specified.

In witness whereof I hereunto set my hand in presence of two witnesses.

WILLIAM H. CHAMBERLIN.

Witnesses:
 WM. CALDWELL,
 B. C. BLAKE.